United States Patent [19]

Aono et al.

[11] Patent Number: 4,922,789
[45] Date of Patent: May 8, 1990

[54] LIMITED SLIP DIFFERENTIAL

[75] Inventors: Koichi Aono; Mitsuyuki Ouchi, both of Susono, Japan

[73] Assignee: Toyota Jiodosha Kabushiki Kaisha, Toyota, Japan

[21] Appl. No.: 287,555

[22] Filed: Dec. 20, 1988

Related U.S. Application Data

[63] Continuation of Ser. No. 79,114, Jul. 29, 1987, abandoned.

[30] Foreign Application Priority Data

Jul. 30, 1986 [JP] Japan .................................. 61-177848
Sep. 29, 1986 [JP] Japan .................................. 61-228445

[51] Int. Cl.$^5$ ............................................. F16H 1/44
[52] U.S. Cl. .................................. 475/86; 192/85 CA
[58] Field of Search ........................ 74/711, 710.5; 192/85 CA

[56] References Cited

U.S. PATENT DOCUMENTS

| | | | |
|---|---|---|---|
| 2,883,026 | 4/1959 | Banker | 74/710.5 |
| 2,894,416 | 7/1959 | Scott | 74/170.5 |
| 2,913,928 | 11/1959 | Double | 74/710.5 |
| 2,991,664 | 7/1961 | Bernotas | 74/711 |
| 3,138,970 | 6/1964 | Costa | 74/711 |
| 3,439,785 | 4/1969 | Hughson | 74/710.5 |
| 3,448,635 | 6/1969 | Nelson | 74/711 |
| 3,605,965 | 9/1971 | Thomas | 192/85 CA |
| 3,628,399 | 12/1971 | Seitz | 74/711 |
| 3,894,446 | 7/1975 | Snoy et al. | 74/711 |
| 3,974,717 | 8/1976 | Breed | 74/710.5 |
| 3,987,689 | 10/1976 | Engle | 74/711 |
| 4,041,804 | 8/1977 | Clark | 74/711 |
| 4,070,924 | 1/1978 | Moreno | 74/710.5 |
| 4,625,584 | 12/1986 | Onodera | 74/711 X |
| 4,662,499 | 5/1987 | Jordan | 74/711 |
| 4,679,463 | 7/1987 | Ozaki et al. | 74/710.5 |
| 4,681,180 | 7/1987 | Oyama | 74/711 |
| 4,703,671 | 11/1987 | Jikihara | 74/710.5 |
| 4,715,248 | 12/1987 | Gant | 74/710.5 |
| 4,732,052 | 3/1988 | Dewald | 74/711 |
| 4,763,749 | 8/1988 | Miura et al. | 74/710.5 X |

FOREIGN PATENT DOCUMENTS

| | | | |
|---|---|---|---|
| 600138 | 6/1960 | Canada | 74/710.5 |
| 0185247 | 12/1985 | European Pat. Off. | |
| 59-68846 | 5/1984 | Japan | |
| 59-70952 | 5/1984 | Japan | |
| 60-237242 | 11/1985 | Japan | |
| 61-73430 | 5/1986 | Japan | |
| 281096 | 1/1971 | U.S.S.R. | 74/710.5 |
| 1024137 | 3/1966 | United Kingdom | |
| 1224034 | 3/1971 | United Kingdom | |

Primary Examiner—Leslie A. Braun
Assistant Examiner—Chris Campbell
Attorney, Agent, or Firm—Oblon, Spivak, McClelland, Maier & Neustadt

[57] ABSTRACT

A limited slip differential includes a differential carrier for supporting rotatably a differential case, surrounding the differential case and first and second frictional materials and having a piston chamber connected to an outside pressure source, a first piston disposed shiftably and unrotatably in the piston chamber, a second piston disposed rotatably together with the first frictional materials and shiftably along a rotary axis of the differential case and a thrust bearing disposed between the first and second pistons.

14 Claims, 3 Drawing Sheets

LIMITED SLIP DIFFERENTIAL

This application is a continuation of application Ser. No. 079,114, filed on July 29, 1987, now abandoned.

BACKGROUND OF THE INVENTION

1. Field of the Invention:

This invention relates to a limited slip differential and, more particularly, to a device for limiting the differential motion by utilizing frictional force generated through the contact of a plurality of frictional materials by the external operation.

2. Description of the Prior Art:

There have been proposed some types of devices which limit the differential motion by utilizing the frictional force generated through the contact of a plurality of frictional materails by the external operation.

The first type of the device has been disclosed in the Japanese Utility Model Public Disclosure (KOKAI) No. 68846/84, which comprises a hydraulic cylinder disposed at the outside of a differential carrier (hereinafter referred to as carrier), a lever operated by the hydraulic cylinder and engaging a hub in the carrier to shift a side gear in a differential gear through the hub and a plurality of frictional materials disposed between the side gear and a differential case (hereinafter referred to as case).

The second type of the device has been disclosed in the Japanese Utility Model Public Disclosure (KOKAI) No. 70952/84 and the Specification of U.S. Pat. No. 3,894,446, which has a pump provided at the outside of a carrier. The pressure generated by the pump is directed once to a shaft supported rotatably in the carrier and further directed from the shaft to an operational chamber provided in a member supported rotatably relative to the shaft, thereby permitting to contact frictional materials with each other due to this pressure.

The third type of the device has been disclosed in the Japanese Utility Model Public Disclosure (KOKAI) No. 73430/86, which comprises a first piston shiftably disposed in a carrier to be hydraulically operated, a second piston shiftably disposed in a case and engaging frictional materials and a thrust bearing interposed between both pistons.

SUMMARY OF THE INVENTION

In the first type of the device noted above, since the lever is supported in cantilever relation to a support portion thereof, the rigidity of the support portion needs to be increased and the assembling operation is complicated.

In the second type of the device noted above, since the pressure from the outside pump flows through between non-rotatable and rotatable portions, a seal contacting the rotatable portion should be provided. However, the seal is liable to wear and lacks reliability.

In the third type of the device noted above, since a portion of the second piston extends through the case and contacts the frictional material in order to ensure for the second piston to be rotated together with the case and to be shifted simultaneously, a contact area of the second piston with the frictional material is small. Thus, the whole device becomes large-sized to ensure sufficient contact surface pressure.

An object of the present invention is to provide a limited slip differential gear which can ensure sufficient rigidity, dispense with a seal member in a rotary portion and increase a contact surface pressure of a piston.

A further object of the present invention is to provide a limited slip differential gear capable of transmitting large and small torques without relying on the adjustment of pressure in a pressure source.

According to the present invention, there is provided a device, in which the differential motion generated by the co-operation of a case, a plurality of pinions and a pair of side gears respectively disposed in the case is limited through frictional force resulting from the contact of a plurality of first frictional materials engaging one side gear with a plurality of second frictional materials engaging the case, comprising a carrier supporting rotatably said case, surrounding said case and first and second frictional materials and having a piston chamber connected to an outside pressure source, a first piston disposed shiftably and unrotatably in said piston chamber, a second piston disposed rotatably together with one of said first and second frictional materials and shiftably along a rotary axis of said case and a thrust bearing disposed between said first and second pistons.

According to the different features of the present invention, the carrier is provided with a piston chamber and a fluid chamber having a pressure receiving area smaller than that of the piston chamber, both chambers being respectively connected to the outside pressure source. On the other hand, the first piston has an auxiliary piston engaging shiftably said fluid chamber. Said device further comprises a directional control valve which is changed over to supply pressurized fluid from the pressure source to said piston chamber or fluid chamber.

In a preferred embodiment of the present invention, the carrier is constituted from a first carrier surrounding said case and a second carrier surrounding said first and second frictional materials. The first and second carriers are individually produced, the second carrier being fixed to the first carrier.

When the pressurized fluid is conducted from the outside into the piston chamber of the carrier, the first piston is shifted and then the second piston is shifted therewith, so that press force is added to the first and second frictional materials. Thus, the differential motion between the side gear and the case is limited. When the supply of pressurized fluid to the piston chamber is stopped, the relative rotation between the first and second frictional materials becomes possible to provide the differential motion.

When the directional control valve is changed over to conduct the pressurized fluid to the fluid chamber of the carrier, small force is added to the auxiliary piston of the first piston and the small torque generates between the friction materials.

Since the piston slides in the piston chamber, the rigidity thereof may be sufficiently increased.

Since the piston chamber connected to the outside pressure source is provided in the carrier disposed fixedly, any seal for a rotary portion is dispensed with.

According to the preferred embodiment, the first and second frictional materials and second piston for the action of differential limit are disposed in the second carrier and their shapes can be at will selected irrespective of the size of the case, and the second piston does not need to extend through the case. Therefore, the contact area of the second piston with the first or second frictional material may be sufficiently enlarged.

Accordingly, the sufficient contact surface pressure may be ensured to provide a compact device.

When the piston chamber is formed to have a large length compared with a stroke of the first piston, the working tolerances of the second carrier, first and second frictional materials and second piston, etc., may be absorbed to omit adjusting shims which are usually necessary when a plurality of parts overlap with each other for use.

Since the piston chamber and the fluid chamber having a small pressure receiving area are provided in the carrier and the supply of pressurized fluid is only changed over with the directional control valve, large and small torques can be obtained without using a pressure regulating valve which is required high accuracy over a wide pressure range.

BRIEF DESCRIPTION OF THE DRAWINGS

The other objects and features of the present invention will become apparent from the following description of preferred embodiments of the invention with reference to the accompanying drawings, in which.

DETAILED DESCRIPTION OF THE PREFERRED EMBODIMENTS

Figure 1:
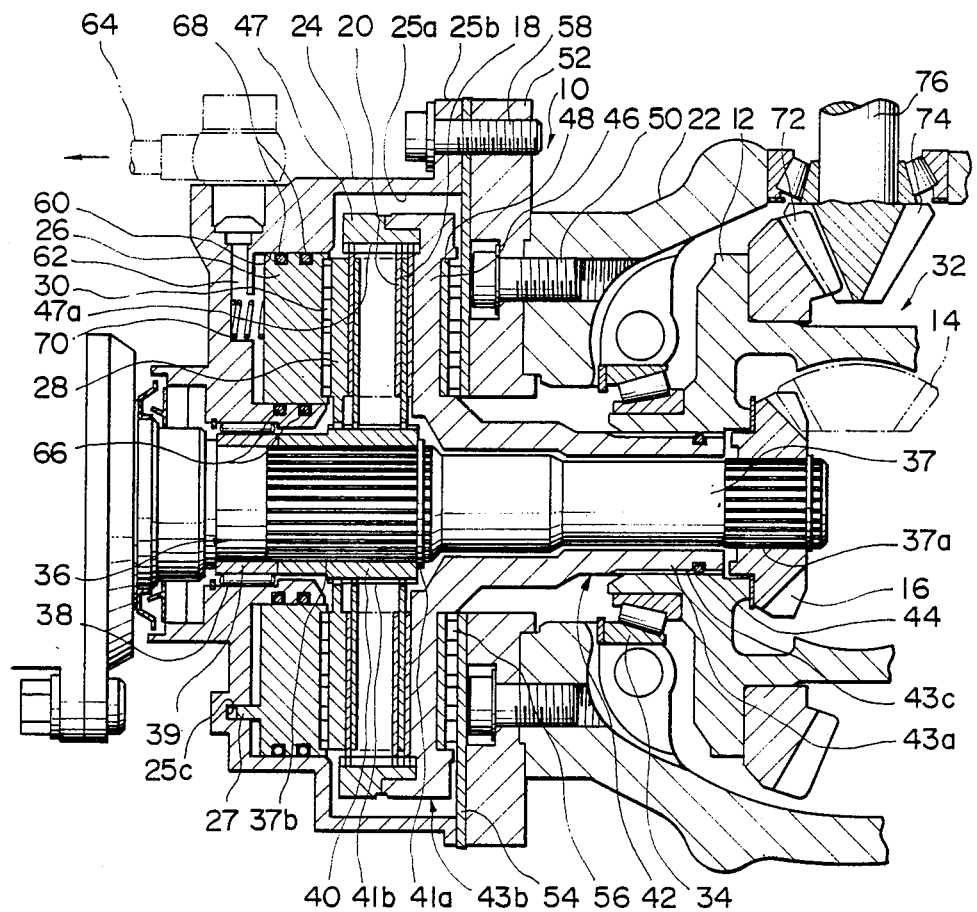
FIG. 1 is a sectional view showing a limited slip differential, a differential gear being shown in the left half in the drawing.

A limited slip differential 10 limits the differential motion generated by the co-operation of a case 12, a plurality of pinions 14 and a pair of side gears 16 (one pinion and one side gear are respectively shown in the drawing) disposed respectively in the case 12 through frictional force resulting from the contact of a plurality of first frictional materials 18 rotatable with one side gear 16 with a plurality of second frictional materials 20 rotatable with the case 12 and disposed alternately with the first frictional materials 18. The device 10 comprises a first carrier 22, a second carrier 24, a first piston 26, a second piston 28 and a thrust bearing 30.

A differential gear 32, as is well known per se, is constituted from the case 12, said plurality of pinions 14 disposed in the case 12 and said pair of side gears 16 disposed in the case 12 to mesh with the pinions 14. The case 12 is received in the carrier 22 to be rotatably supported by roller bearings 34.

A shaft 36 has a shaft portion 37 engaging the side gear 16 and is supported by the case 12 and a roller bearing 38. In the embodiment shown, the shaft portion 37 has a spline 37a. The side gear 16 is fitted on the spline 37a. As a result, the shaft 36 is capable of rotating about a rotary axis of the case 12 together with the side gear 16. The shaft portion 37 extends from the carrier 22 to the outside through a transmitting member which will be later described.

The shaft portion 37 of the shaft 36 is provided on an intermediate portion thereof with a spline 37b. A cylinder 40 is fitted on the spline 37b and sandwiched by a stop ring 41a and a race 39 of the roller bearing 38. The cylinder 40 is provided on an outer peripheral surface thereof with a spline 41b. The plurality of first disk-like frictional materials 18 are fitted on the spline 41b and supported movably in an axial direction, but unrotatably relative to the cylinder 40. The cylinder 40 functions as a spacer to absorb a radial difference of lengthes produced between the shaft portion 37 of the shaft 36 and the transmitting member which will be later described.

The transmitting member 42 is provided with a first hollowed transmitting portion 43a and a second transmitting portion 43b having the expanded diameter. The first transmitting portion 43a is provided on an outer peripheral surface thereof with a spline 43c. The case 12 is fitted on the spline 43c and a clamp ring 44 is disposed between the spline 43c and the case 12. Thus, the first transmitting portion 43a cannot be rotated and shifted axially relative to the case 12. The shaft portion 37 of the shaft 36 is disposed inside the first transmitting portion 43a.

The second transmitting portion 43b is constituted from a disk-like sandwiching portion 46 and a cylindrical support portion 47 press-fitted or welded to the sandwiching portion 46 and extending axially of the shaft 36. A thrust washer 48 is disposed at the side of the carrier 22 of the sandwiching portion 46. The support portion 47 is provided on an inner peripheral surface thereof with a spline 47a. The plurality of second disk-like frictional materials 20 are fitted on the spline 47a and supported unrotatably and movably in the axial direction relative to the support portion 47.

The first carrier 22 has a flange 52 fixed thereto by bolts 50. A thrust washer 54 is applied to the flange 52 and a thrust bearing 56 is disposed between thrust washers 48, 54.

The second carrier 24 has a bore 25a and a flange 25b. The bore 25a has a size to surround the second transmitting portion 43b of the transmitting member 42. Bolts 58 extended through the flange 25b of the second carrier 24 are threaded in the flange 52 of the first carrier 22, so that the second carrier 24 is fixed to the first carrier 22. As a result, the second transmitting portion 43b of the trnasmitting member 42 is surrounded by the second carrier 24, and the shaft 36 projects from the second carrier 24 to the outside. The second carrier 24 has an annular piston chamber 60 which is connected to an outside pressure source through a path 62 and a tube 64 connected to the path 62.

The first piston 26 is annularly formed and shiftably inserted into the piston chamber 60. The piston 26 is held in liquidtight by seal rings 66,68 disposed inward and outward. The first piston 26 has a plurality of pins 27 disposed at equal circumferential intervals and projecting axially. These pins 27 are inserted into holes 25c provided in the second carrier 24. The length of each pin 27 is formed longer than the stroke of the piston 26. As a result, the piston 26 is supported unrotatably relative to the second carrier 24.

A plurality of coil springs 70 (one spring is shown in the drawing) are spaced circumferentially from each other and disposed in the piston chamber 60. The coil spring 70 is a compression spring for giving necessary minimum prepressure to prevent the frictional materials 18, 20 and second piston 28 from axial play and inclination relative to the axis. Thus, the frictional materials 18, 20 and second piston 28 are prevented from the occurrence of offset wear and abnormal sound due to offset contact.

The second piston 28 is annularly formed and fitted on the spline 41b provided on the cylinder 40. Thus, the second piston 28 is supported unrotatably and shiftably in the axial direction relative to the cylinder 40, thus the shaft 36 to be rotated together with the first frictional materials 18. The second piston 28 may be supported unrotatably and shiftably in the axial direction relative to the second transmitting portion 43b of the transmitting member 42.

The thrust bearing 30 is disposed between the first and second pistons 26,28.

Figure 2:
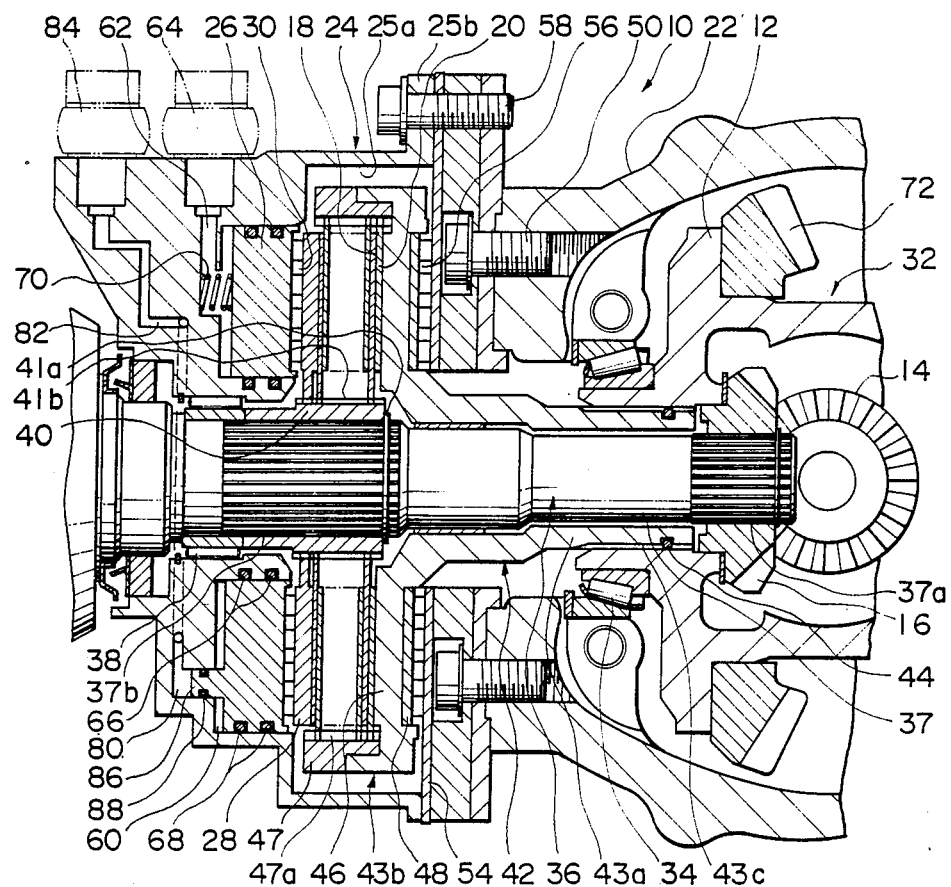
FIG. 2 is a sectional view showing a different embodiment of the limited slip differential, the differential gear being shown in the left half in the drawing.

Referring to FIG. 2 showing a different embodiment of the limited slip differential, the same parts as those shown in FIG. 1 are designated by the same symbols and the description of said parts will be omitted.

The second carrier 24 has the annular piston chamber 60 and a fluid chamber 80 having a pressure receiving area smaller than that of the piston chamber 60. The piston chamber 60 communicates to an outside pressure source (refer to FIG. 3) through the path 62 and tube 64 connected to the path 62. The fluid chamber 80 in the embodiment shown is formed of a plurality of holes provided axially from the piston chamber 60 at equal circumferential intervals. Each hole communicates to a path 82. A tube 84 is connected to the path 82 and the fluid chamber 80 communicates to the outside pressure source.

The first piston 26 has an auxiliary piston. The auxiliary piston in the embodiment shown is formed of portions 86 axially projecting at equal circumferential intervals. The number of said auxiliary piston portions is the same as that of the holes constituting the fluid chamber 80. These auxiliary piston portions 86 are respectively inserted into the holes of the fluid chamber 80 of the second carrier 24. The auxiliary piston portion 86 is held in a liquidtight condition by a seal ring 88 attached to a peripheral surface thereof. The length of the auxiliary piston portion 86 engaging each hole of the fluid chamber 80 is formed longer than the stroke of the piston 26, so that the piston 26 is supported unrotatably relative to the second carrier 24. Namely, in the embodiment shown, the auxiliary piston portion 86 has the functions of receiving pressure from the fluid chamber 80 and stopping the rotation of piston 26.

Figure 3:
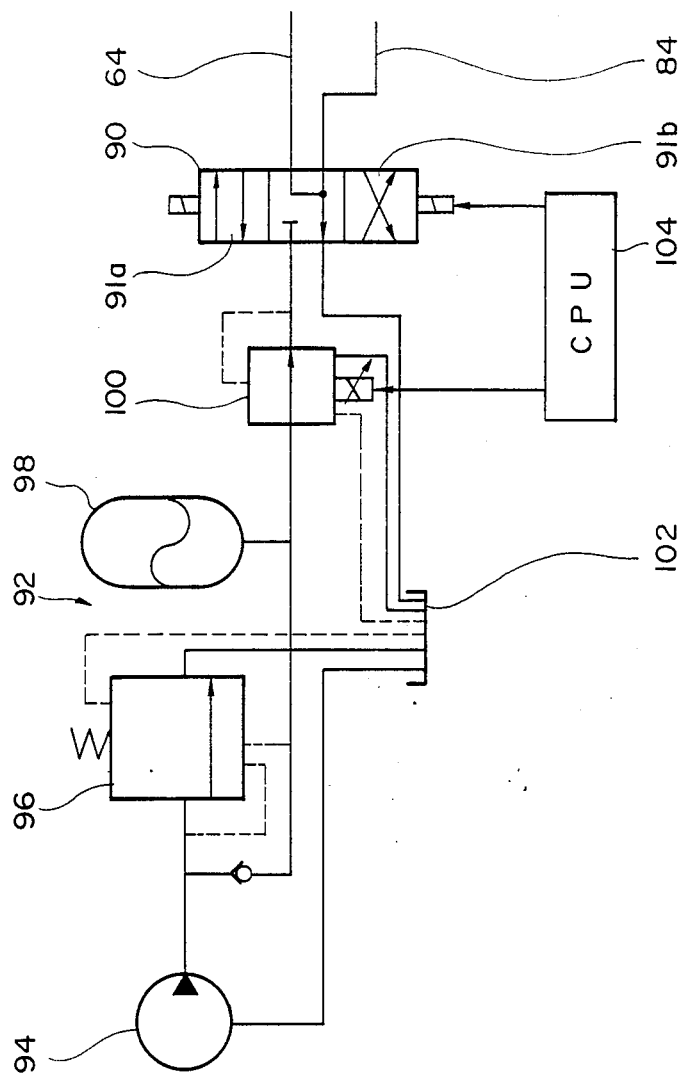
FIG. 3 is a circuit diagram of fluid.

The supply of pressurized fluid from the outside pressure source is carried out not only manually, but also automatically by a CPU or computer as shown in FIG. 3. In the embodiment shown in FIG. 3, the tubes 64,84 are connected to a directional control valve 90 which is connected to a pump 94 through a constant pressure generating source 92. The source 92 is constituted from an unloading relief valve 96, an accumulator 98 and a pressure reducing valve 100. Pressure generated by the pump 94 is maintained constant in the accumulator 98.

The directional control valve 90 is a solenoid operated valve. When said valve is located neutrally as shown in the drawing, both piston chamber 60 and fluid chamber 80 are opened to a reservoir tank 102. When a first envelope 91a is opposed to the tubes, the piston chamber 60 communicates to the constant pressure generating source 92 while the fluid chamber 80 is opened to the reservoir tank 102. When a second envelope 91b is opposed to the tubes, the fluid chamber 80 communicates to the constant pressure generating source 92 while the piston chamber 60 is opened to the reservoir tank 102. The change-over of the directional control valve 90 and the pressure setting of the pressure reducing valve 100 are controlled by a CPU or computer 104.

OPERATION OF EMBODIMENT

A ring gear 72 is fixed to the case 12 of the differential gear 32 to mesh with a drive gear 74. When a propeller shaft 76 is rotated, the case 12 of the differential gear 32 is rotated through the drive gear 74 and ring gear 72. The rotation is transmitted to the shaft 36 and an another shaft (not shown) which is connected to the another side gear in the case 12.

When the pressurized fluid is supplied from the outside pressure source to the piston chamber 60 through the tube 64, the first piston 26 is shifted and the second piston 28 is also shifted. By the shift of the second piston 28 are sandwiched the first and second frictional materials 18, 20 between the second piston 28 and the second transmitting portion 43b of the transmitting member 42. At this time, differential limiting torque is generated on the shaft 36 and another shaft. The press force at that time is transmitted from the thrust washer 48 to the thrust washer 54 through the thrust bearing 56 and stopped by the first carrier 22.

When the supply of pressurized fluid from the outside pressure source is stopped, the press action of the second piston 28 is lost. The differential limiting torque disappears at this time, thus, the differential gear 32 can perform the usual differential motion.

In the embodiment shown in FIG. 2, when the CPU 104 judges the differential motion to be limited with large torque, the directional control valve 90 is changed over to locate the first envelope 91a opposed to the tubes 64,84. Then, the pressurized fluid is supplied to the piston chamber 60 through the tube 64 to shift the first piston 26 and then the second piston 28. By the shift of the second piston 28 are sandwiched the first and second frictional materials 18,20 between the second piston 28 and the sandwiching portion 46 of the transmitting member 42. At this time, the large differential limiting torque is generated on the shaft 36 and another shaft.

When the CPU 104 judges the differential motion to be limited with small torque, the directional control valve 90 is changed over to locate the second envelope 91b opposed to the tubes 64,84. Then, the pressurized fluid is supplied to the fluid chamber 80 through the tube 84. Therefore, the first and second frictional materials 18,20 are sandwiched with small force.

What is claimed is:

1. A limited slip differential for limiting the differential motion generated by the cooperation of a differential case, a plurality of pinions and a pair of side gears respectively disposed in the differential case through frictional force resulting from the contact of a plurality of first frictional materials rotatable with one side gear with a plurality of second frictional materials rotatable with the differential case, the first and second frictional materials being disposed exterior to and at one side with respect to the differential case, comprising:
    a differential carrier to be mounted stationarily on a vehicle body for supporting rotatably said differential case, surrounding said differential case and first and second frictional materials and having a piston chamber connected to an outside pressure source, the piston chamber being defined by a cylindrical inner portion and a cylindrical outer port of the differential carrier and formed in an annular shape;
    an annular first piston disposed shiftably and unrotatably in said piston chamber;
    an annular second piston disposed rotatably together with one of said first and second frictional materials and shiftably along a rotary axis of said differential case;

a first thrust bearing between said first and second pistons;

a transmitting member fixed to said differential case at a position between said friction materials and said differential case, and having a portion facing the differential carrier and disposed at an opposite side of said friction materials from said first and second pistons; and a second thrust bearing disposed between the differential carrier and the portion of the transmitting member, wherein said second piston receives compressive force through the first thrust bearing directly from said first piston which is operated by fluid pressure directed from said outside pressure source, and wherein said compressive force is transmitted to and received by the differential carrier through said portion of the transmitting member and second thrust bearing, whereby said differential case is isolated from said compressive force.

2. A limited slip differential as claimed in claim 1, wherein said differential carrier has at least a hole extending axially from said piston chamber and said first piston has at least a pin projecting axially, the number of said pin being the same as that of said hole and each pin being inserted into each hole of said differential carrier, thereby blocking the rotation of said first piston.

3. A limited slip differential as claimed in claim 2, wherein the depth of each hole and the length of each pin are formed longer than the stroke of the first piston.

4. A limited slip differential as claimed in claim 1, further comprising a plurality of springs disposed at circumferential intervals in said piston chamber.

5. A limited slip differential as claimed in claim 1, wherein said first frictional materials are supported shiftably in the axial direction and unrotatably by a spacer cylinder fitted on a shaft extending from said one side gear, and wherein said second frictional materials are supported shiftably in the axial direction and unrotatably by the transmitting member.

6. A limited slip differential as claimed in claim 5, further comprising at least a thrust washer and a thrust bearing respectively disposed between said transmitting member and said differential carrier at an opposite side of said first and second pistons.

7. A limited slip differential for limiting the differential motion generated by the cooperation of a differential case, a plurality of pinions and a pair of side gears respectively disposed in the differential case through frictional force resulting from the contact of a plurality of first frictional materials rotatable with one side gear with a plurality of second frictional materials rotatable with the differential case, the first and second frictional materials being disposed at one side with respect to the differential case, comprising:

a first differential carrier to be mounted stationarily on a vehicle body for supporting rotatably and surrounding said differential case;

a second differential carrier formed separately from and fixed to said first differential carrier, surrounding said first and second frictional materials and having a piston chamber connected to an outside pressure source and at least one hole extending from the piston chamber axially, the piston chamber being defined by a cylindrical inner portion and a cylindrical outer portion of the second differential carrier and formed in an annular shape;

an annular first piston disposed shiftably in said piston chamber and having at least one pin axially projecting to be inserted into said hole, the number of said pins being the same as that of the hole;

an annular second piston disposed rotatably together with one of said first and second frictional materials and shiftably along a rotary axis of said differential case; and a thrust bearing disposed between said first and second pistons, wherein said second piston receives compressive force through the thrust bearing directly from said first piston which is operated by fluid pressure directed from said outside pressure source.

8. A limited slip differential for limiting the differential motion generated by the cooperation of a differential case, a plurality of pinions and pair of side gears respectively disposed in the differential case through frictional force resulting from the contact of a plurality of first frictional materials rotatable with one side area with a plurality of second frictional materials rotatable with the differential case, the first and second frictional materials being disposed at one side with respect to the differential case, comprising:

a differential carrier to be mounted stationarily on a vehicle body for supporting rotatably said differential case, surrounding said differential case and first and second frictional materials and having a piston chamber and a fluid chamber respectively connected to an outside pressure source, the piston chamber defined by a cylindrical inner portion and a cylindrical outer portion of the differential carrier and formed in an annular shape, and the fluid chamber having a pressure receiving area smaller than that of the piston chamber;

an annular first piston disposed shiftably and unrotatably in said piston chamber and having an auxiliary piston engaging shiftably said fluid chamber;

a directional control valve for changing over to supply pressurized fluid from said pressure source to said piston chamber or fluid chamber;

an annular second piston disposed rotatably together with one of said first and second frictional materials and shiftably along a rotary axis of said differential case; and a thrust bearing disposed between said first and second pistons, wherein said second piston receives large compressive force through the thrust bearing directly from said first piston when fluid pressure is directed to said piston chamber and small compressive force when fluid pressure is directed to said fluid chamber.

9. A limited slip differential as claimed in claim 8, wherein said differential carrier is constituted from a first carrier surrounding said differential case and a second carrier surrounding said first and second frictional materials, the second carrier being formed separately from and fixed to said first carrier.

10. A limited slip differential as claimed in claim 8, wherein said fluid chamber is formed into holes extending axially from said piston chamber, and wherein said auxiliary piston is formed into portions projecting axially, the number of portions being the same as that of the holes and each portion being inserted into each hole under a sealed condition, thereby each of said auxiliary piston portions functioning to receive pressure and block the rotation of said first piston.

11. A limited slip differential as claimed in claim 10, wherein the depth of each hole and the length of each auxiliary piston portion are formed longer than the stroke of the first piston.

12. A limited slip differential as claimed in claim 8, further comprising a plurality of springs disposed at circumferential intervals in said piston chamber.

13. A limited slip differential for limiting the differential motion generated by the cooperation of a differential case, a plurality of pinions and a pair of side gears respectively disposed in the differential case through frictional force resulting from the contact of a plurality of first frictional materials rotatable with one side gear with a plurality of second frictional materials rotatable with the differential case, the first and second frictional materials being disposed at one side with respect to the differential case, comprising:

a first differential carrier to be mounted stationarily on a vehicle body for supporting rotatably and surrounding said differential case;

a second differential carrier formed separately from and fixed to said first differential carrier, surrounding said first and second frictional materials and having a piston chamber and a fluid chamber respectively connected to an outside pressure source, the piston chamber being defined by a cylindrical inner portion and a cylindrical outer portion of the second differential carrier and formed in an annular shape, and the fluid chamber being formed into holes extending axially from the piston chamber;

an annular first piston disposed shiftably in said piston chamber and having auxiliary piston portions projecting axially the number of which is the same as that of said holes, the auxiliary portions being inserted into the respective holes under the sealed conditions;

a directional control valve for changing over to supply pressurized fluid from said pressure source to said piston chamber or fluid chamber;

an annular second piston disposed rotatably together with one of said first and second frictional materials and shiftably along a rotary axis of said differential case; and a thrust bearing disposed between said first and second pistons, wherein said second piston receives large compressive force through the thrust bearing directly from said first piston when fluid pressure is directed to said piston chamber and small compressive force when fluid pressure is directed to said fluid chamber.

14. A limited slip differential for limiting the differential motion generated by the cooperation of a differential case, a plurality of pinions and a pair of side gears respectively disposed in the differential case through frictional force resulting from the contact of a plurality of first frictional materials rotatable with one side gear with a plurality of second frictional materials rotatable with the differential case, the first and second frictional materials being disposed exterior to and at one side with respect to the differential case, comprising:

a differential carrier to be mounted stationarily on a vehicle body for supporting rotatably said differential case, surrounding said differential case and first and second frictional materials and having a piston chamber connected to an outside pressure source, the piston chamber being defined by a cylindrical inner portion and a cylindrical outer portion of the differential carrier and formed in an annular shape;

an annular first piston disposed shiftably and unrotatably in said piston chamber;

an annular second piston disposed rotatably together with one of said first and second frictional materials and shiftably along a rotary axis of said differential case; and a thrust bearing disposed between said first and second pistons, wherein said second piston receives compressive force through the thrust bearing directly from said first piston which is operated by fluid pressure directed from said outside pressure source, wherein said differential carrier is constituted from a first carrier surrounding said differential case and a second carrier surrounding said first and second frictional materials and said piston chamber and formed separately from said first carrier, said second carrier being fixed to said first carrier.

* * * * *

UNITED STATES PATENT AND TRADEMARK OFFICE
CERTIFICATE OF CORRECTION

PATENT NO. : 4,922,789

DATED : MAY 8, 1990

INVENTOR(S) : KOICHI AONO ET AL.

It is certified that error appears in the above-identified patent and that said Letters Patent is hereby corrected as shown below:

ON THE TITLE PAGE:

In the Assignee, delete "Jiodosha" and insert --Jidosha--.

Signed and Sealed this

Third Day of December, 1991

Attest:

HARRY F. MANBECK, JR.

*Attesting Officer*     *Commissioner of Patents and Trademarks*